United States Patent [19]

Sherar

[11] Patent Number: 5,466,082
[45] Date of Patent: Nov. 14, 1995

[54] IN-LINE SAFETY SHACKLE

[75] Inventor: James R. Sherar, Arden, N.C.

[73] Assignee: The United States of America as represented by the Secretary of Agriculture, Washington, D.C.

[21] Appl. No.: 159,168

[22] Filed: Nov. 30, 1993

[51] Int. Cl.$^6$ .................................................. F16D 9/00
[52] U.S. Cl. .................................. 403/2; 403/79; 403/157
[58] Field of Search .................................. 403/2, 79, 11, 403/16, 41, 157, 161, DIG. 3; 411/4, 916; 37/395, 394, 401, 466; 212/76, 77, 100, 271

[56] References Cited

U.S. PATENT DOCUMENTS

| 2,085,074 | 6/1937 | Boyles | 403/2 |
| 2,499,709 | 3/1950 | Whitman et al. | 403/2 X |
| 3,855,818 | 12/1974 | Hochreuter . | |
| 3,857,257 | 12/1974 | Steiner et al. . | |
| 3,944,023 | 3/1976 | Fisher | 403/2 X |
| 3,982,408 | 9/1976 | Wright . | |
| 4,086,012 | 4/1978 | Buckley et al. | 403/2 |
| 4,183,231 | 1/1980 | van der Lely . | |
| 4,300,364 | 11/1981 | van der Lely et al. . | |
| 4,330,926 | 5/1982 | McCall | 403/2 X |
| 4,359,880 | 11/1982 | Berlin et al. | 464/33 |
| 4,687,365 | 8/1987 | Promersberger | 403/2 |
| 4,720,204 | 1/1988 | Johnson | 403/2 X |
| 5,122,007 | 6/1992 | Smith | 403/2 |
| 5,160,111 | 11/1992 | Hugron | 403/2 X |

FOREIGN PATENT DOCUMENTS

| 2053832 | 11/1972 | Germany | 403/2 |
| 137690 | 10/1979 | Japan | 403/2 |

OTHER PUBLICATIONS

Logging Systems Guide–USDA–Forest Service–Alaska Region, Apr. 1978 Series R–10–21,43.3–43.56.
"Remote Tension Monitor for Cable Haulers" Logging Industry Research Org. Tech. Note TN–5, Feb. 1992.
Guideline Anchors for Cable Logging, USDA Forest Service and Dimers Eapt. Dev. Ctr, Jun. 1979.
Oregon Occupational Safety & Health Code Div. 80 Logging, Effec. Mar. 1, 1980 (as amended through Sep. 1, 1982) 437–80–275 Guylines–General–pp. 24–28, 45–47, 134–148.

Primary Examiner—Randolph A. Reese
Assistant Examiner—Harry C. Kim
Attorney, Agent, or Firm—Janet I. Stockhausen; M. Howard Silverstein; John D. Fado

[57] ABSTRACT

A linear in-line safety shackle device includes a first connecting member engaging a first cable, a second connecting member engaging a second cable, and a device for releasibly securing the first connecting member with the second connecting member. Further provided is at least one safety cable which prevents premature complete separation of the first connecting member from the second connecting member.

9 Claims, 4 Drawing Sheets

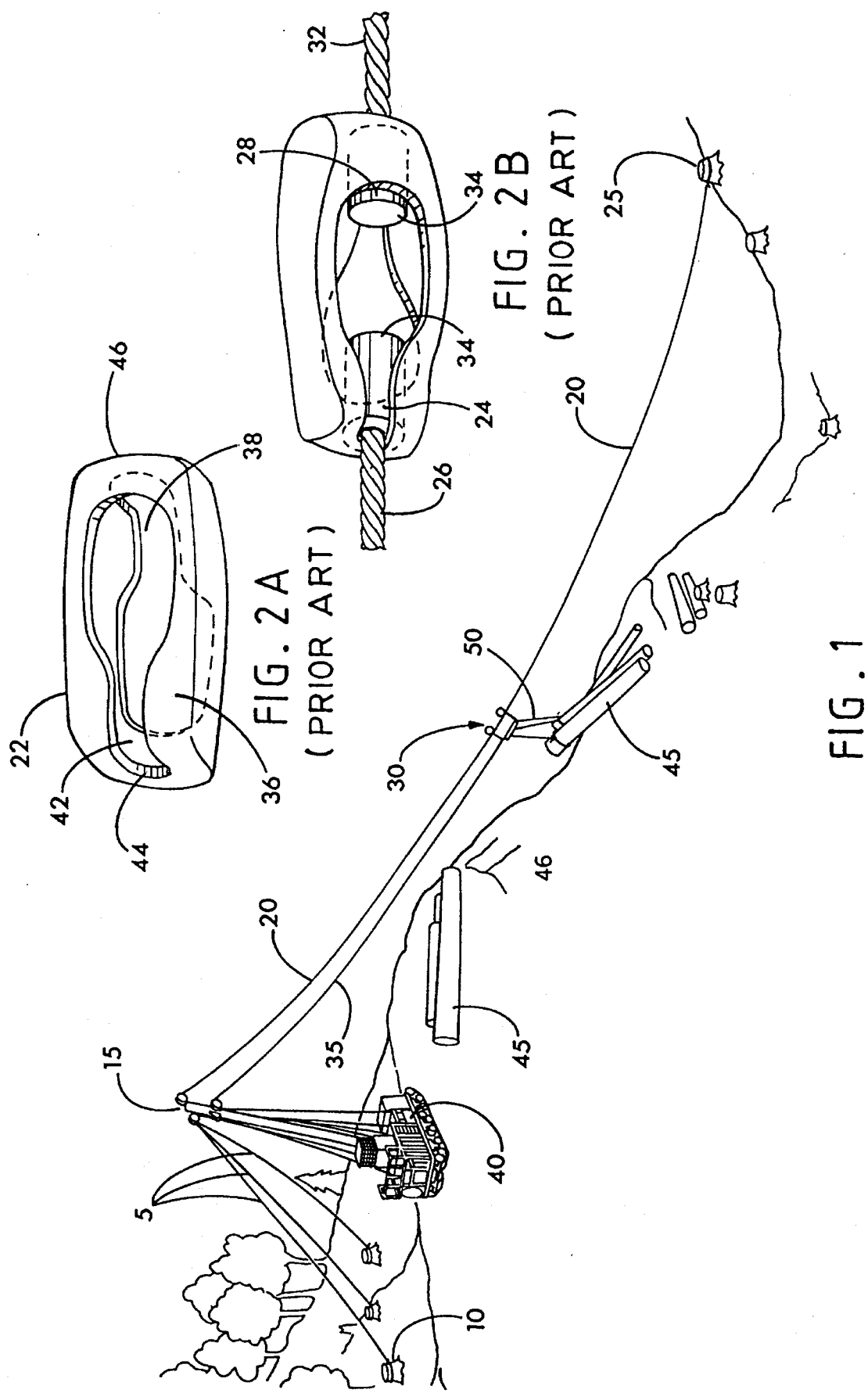

5,466,082

IN-LINE SAFETY SHACKLE

FIELD OF THE INVENTION

The present invention relates to safety devices in general. The present invention is preferably directed to a safety device for protecting a cable from breaking due to overload stress.

DESCRIPTION OF THE PRIOR ART

For purposes of the present invention, the term "cable" is generically used to describe a wide range of ropes, wires or chains. Preferably, the cables are flexible. Most commonly, the term will refer to a wire or hemp rope used for lifting, hauling, winding, towing, stabilizing, guying and other similar chores.

When dynamic tension is applied to a cable, as described above, the cable is subjected to unpredictable loads, which may overstress the cable. Left unchecked, the overstressed cable will fail and break apart causing serious damage or injury. One example of a situation in which cables may become overstressed is in the logging industry.

FIG. 1 illustrates a general overview of a logging operation known as a cable yarder setup. This operation is designed to move logs 45 up the side of a hill 46 in the following manner. In the illustrated embodiment, supporting cable guylines 5 are attached to stumps 10 at one end and a crane 15 at the other end. A cable skyline 20 is also attached to the crane 15 at one end and a tail hold stump 25 at the other end. The cable guylines 5 and the cable skyline 20 are made of wire rope in the preferred embodiment. A carriage 30 having rotating wheels for riding on the skyline 20 is suspended from the skyline 20 for substantially linear movement. A cable mainline 35 is attached to a winding spool 40 on the crane 15 at one end and the carriage 30 at the other end. The crane 15 provides the machinery to move the carriage 30 along the skyline 20. Logs 45 are attached to the carriage 30 by cable chokers 50 for movement from one position to another along the axial length of the skyline 20 on the hill 46.

Each of the guylines 5, skyline 20, mainline 35 and chokers 45 is put under a tremendous dynamic stress when a large load of logs 45 attached to the carriage 30 is hoisted along the skyline 20. It is difficult to predict the actual forces on these cables from these dynamic stresses.

FIGS. 2A and 2B illustrate a prior art device for attaching two cables, known as a double-end guyline hook 22. The double-end guyline hook 22 is used to connect one end 24 of a first cable 26 to another end 28 of a second cable 32. The cables 26 and 32 are provided with ferrules 34, known to the art. The ferrules 34 have a diameter larger than the diameter of the cable and are designed for permanent attachment to the cable ends. In this manner the ferrules 34 can be used to "hook" the cable to the guyline hook 22. The guyline hook 22 is a substantially symmetrically shaped metal device having on one side 36 an opening 38 at least larger than the ferrule 34 of either cable 26 or 32 and a throat 42 extending from the opening 38 to a first end 44 of the hook 22 as illustrated. The opposing side of the hook 22 also contains an opening 38 and a throat 42 similar to side 34, but is oppositely positioned such that the throat 42 of the opposing side extends toward the second end 46 of the hook 22. The cables 26, 32 are releasibly attached to the hook 22 by passing the ends 24, 28 through respective openings 38 and sliding the cable down the respective throats 42. Because the cable diameter is smaller than the throat but the ferrules 34 have a larger diameter than the throat, the cables 26, 32 can be slipped in the hook 22 and joined together in the manner illustrated in FIG. 2b.

While the guyline hook 22 provides a means for attaching the ends of two cables, there is no protection against failure from a dynamic load bearing on either the cable or the hook 22 that is too great for the cable or hook. Therefore, the hook 22 suffers from the disadvantage in that it does not have a safety feature to maintain the integrity of the cable system if the dynamic load on the system approaches or exceeds the breaking strength of either cable 26 or 32.

Safety devices are known in the prior art, but none appear to address the deficiencies described above. One such safety device involves the use of shear pins. Shear pins have been used in applications where a drive source is connected to a variable load. The shear pins are usually related to rotation devices requiring torque protection. If the load exceeds a predetermined value, the shear pin shears or breaks which disconnects the drive source from the load and prevents damage to the source, the linkage or the load itself.

In one prior art embodiment, a rotation shear joint is used as a safety coupling between a driving coupling and a driven coupling that shears upon overload, allowing relative movement between the two couplings. This embodiment is particularly useful in soil cultivating implements or rotary harrows as shown in U.S. Pat. No. 4,183,231 to van der Lely. The shear pin is urged to establish a second operative connection after limited relative movement between the couplings. In each operative connection, respective stops retain the pin against further displacement. In one application, soil working rotors are rotated by shafts coupled to tool supports. One or more of the driving shafts can be connected to its driven support through a shear pin. A flange on the shaft has an opening that houses the lower part of the pin and the tool support has a bore that houses an upper pin part. When the pin shears, a second operative connection is established.

A disadvantage of the prior art devices utilizing shear pins is that their use has been restricted to rotational apparatus.

SUMMARY OF THE INVENTION

The present invention is directed to an in-line safety shackle device for a cable system including a first cable and a second cable. The device comprises a first member adapted to engage the first cable, and a second member adapted to engage the second cable, wherein the second member releasibly interfits with the first member. At least one safety cable is provided for substantially permanently securing the first member to the second member. The device also comprises means releasibly connecting the first member to the second member, the means being provided with a predetermined shear force sufficient to release the first member from the second member before the first or second cable breaks due to the dynamic tension placed on the cables.

The present invention is also directed to an in-line safety shackle device for a cable system including a first cable and a second cable comprising a first member adapted to releasibly engage the first cable. The first member includes a first cable shaft and a first shear pin shaft. The first member further includes at least one safety cable shaft for receiving a first end of a safety cable. The device further comprises a second member adapted to releasibly engage the second cable. The second member includes a second cable shaft and a second shear pin shaft, wherein the second member is adapted to releasibly interfit with the first member. The second member further includes at least one safety cable shaft for receiving a second end of the safety cable. Further, the device of the present invention comprises at least one safety cable having a first end attached to the safety cable shaft of the first member and a second end attached to the safety cable shaft of the second member. The safety cable substantially permanently secures the first member to the second member. Finally, the device comprises a shear pin connecting the first member to the second member. The shear pin is provided with a designed shear strength which is less than the tensile force of the safety cable.

While the present invention is primarily directed to a safety device for use in the logging industry, it also has application to any field where a cable is used for lifting, hauling, winding, towing, etc. Unpredictable dynamic loading occurs at times during the cable yarder operation. The dynamic load may overstress the wire rope and failure may occur, causing potential expensive damage, down time and possible injury to workers.

The in-line safety shackle is designed to prevent these types of failure by using a shear pin, which is precisely manufactured to fail at a predictable stress load. If the shear pin fails, a back-up system utilizing the safety cable attached to the connecting members is designed to withstand the maximum expected dynamic load. Thus, the shear pin in-line safety shackle is designed to fail first, and the safety cable is designed to take up the slack which gives the machine operator a chance to correct the overload before a major injury or loss occurs.

The in-line safety shackle device of the present invention is primarily used in a linear cable system in contrast to the prior art rotational systems. For example, the present invention has direct application to the logging cable yarder setup as illustrated in FIG. 1. The in-line safety shackle of the present invention may be utilized with the guylines 5 to prevent complete breakage of the cable. Further, the safety shackle may also be used with skyline 20 close to where skyline 20 is attached to the tailhold stump 25.

Reference is now made in detail to the preferred embodiments of the invention, examples of which are illustrated in the accompanying drawings.

BRIEF DESCRIPTION OF THE DRAWINGS

FIG. 1 is a perspective overview of a cable yarder setup.

FIG. 2a is a perspective view of a prior art guyline hook.

FIG. 2b is an alternative perspective view of the prior art guyline hook of FIG. 2a with cables attached thereto.

FIG. 4b is a side elevated view of the in-line safety shackle of FIG. 4a.

FIG. 5 is a partial exploded top elevated view of the in-line safety shackle of FIG. 4a.

DETAILED DESCRIPTION OF THE INVENTION

The present invention is a linear cable connector comprising a first member engaging a first cable and a second member engaging a second cable. Also involved is a coupler for registering the first member with the second member to connect the first cable with the second cable. The invention further provides for a safety link which prevents premature separation of the first member from the second member. The safety link utilizes at least one safety cable which is a wire rope or cable. The first member is considered a female member for closely registering with the second male member into a complementary fit.

Figure 3:
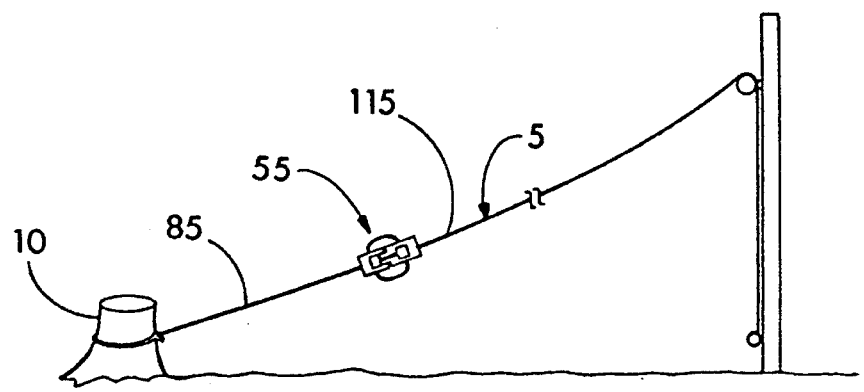
FIG. 3 is a side elevated view of a guyline attachment in a cable yarder setup and an amplified view of the in-line safety shackle as used with a guyline.

Reference is now made to FIG. 3, which illustrates an in-line safety shackle device 55 of the present invention in use. As illustrated, the device 55 is attached to a guyline cable 5. The cable 5 includes a first cable 85 and a second cable 115. The first cable 85 is attached to the safety shackle device 55 on one end and the second cable 115 is attached to the safety shackle device 55 on the other end. As will be described in the following paragraphs, the safety shackle device 55 operates to protect the integrity of the guyline cable 5 by preventing the complete separation when a predetermined load is exceeded.

Figure 4B:
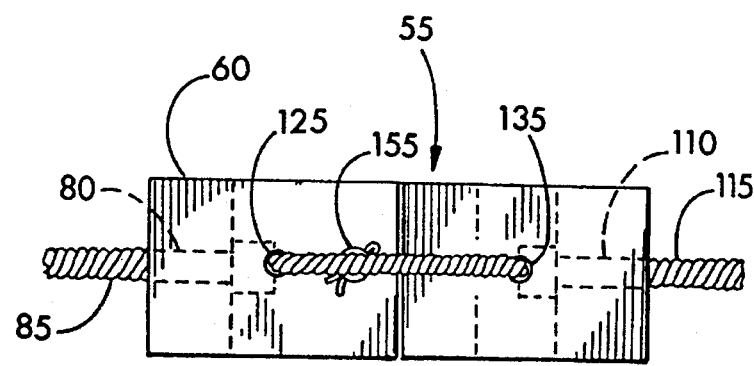
Figure 4A:
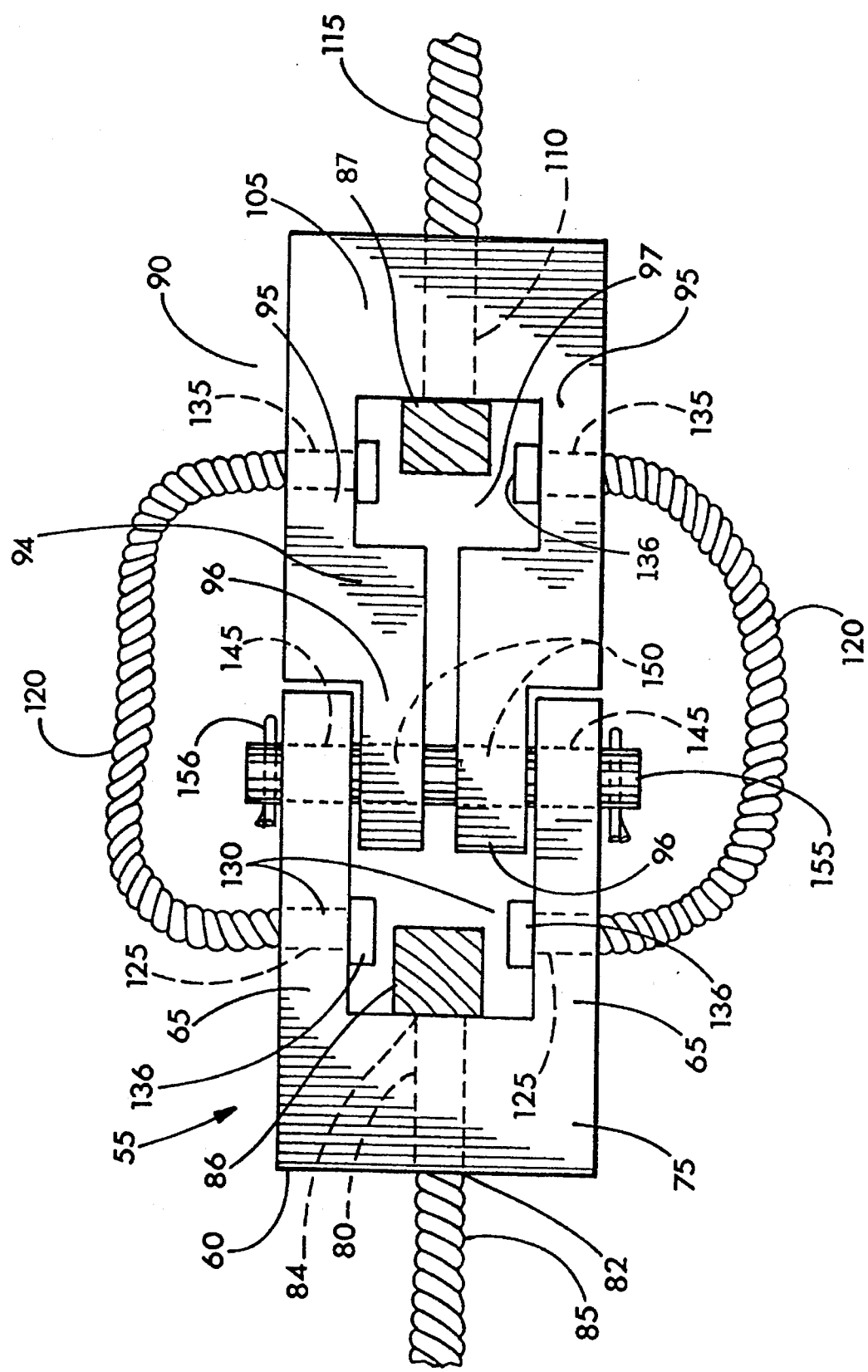
FIG. 4a is a top elevated view of the in-line safety shackle of the present invention attached to a wire rope.

Referring now to FIGS. 4a and 4b, there is illustrated the preferred embodiment of the safety shackle device 55. The device 55 includes a first female connecting member 60, which is shown as a substantially U-shaped member including two legs 65 extending outwardly from a base 75. In the illustrated embodiment, the base 75 is defined by a conduit 80 to receive the first cable 85 and attach the first cable to the device 55. The conduit 80 is generally centrally disposed through the base 75 and includes a first opening 82 and a second opening 84 for receiving the first cable 85. The first cable 85 is secured to the first member 60 by a ferrule 86. For a description of the ferrule 86, reference is made to the ferrule connection as described in the background section with respect to FIGS. 2A and 2B. In this manner of attachment, the first cable 85 is attached to the first connecting member 60 of the safety device 55.

Shear pin apertures 145 are located in the legs 65 of the first member 60. Likewise, safety cable apertures 125 are also located in the legs 65 of the first member 60. The purpose of the apertures 125 and 145 will be explained in this specification.

The safety device 55 also includes a second male connecting member 90, which has a complementary shape to first member 60. The second connecting member 90 includes a base 105 which is a substantially rectangular piece, opposing legs 95, and a connecting end 94 for attachment to the first member 60. As illustrated, the connecting end 94 includes two flanges 96 in the preferred embodiment. In the alternative, the connecting end 94 can be solid as long as it has cavity 97 to provide the necessary space to receive a second cable 115 and the ends of the safety cable 120. The base 105 is provided with safety cable apertures. The connecting end 94 is reduced in size to interfit with the first member 60.

The base end 105 includes conduit 110 for receiving the second cable 115 and for securing it within the second member 90. The second connecting member 90 is also provided with shear pin apertures 150 located in the flanges 96 at the connecting end 94 and safety cable apertures 135 in the opposing legs 95 as illustrated.

In an alternative embodiment, not illustrated in FIGS. 4A or 4B, the first member 60 and the second member 90 may be designed with a throat and opening, similar to that illustrated in prior art FIGS. 2A and 2B, to removably receive the cable 85, 115. The cables 85 and 115 may then be placed within the safety shackle 55 by passing the ferrule 86, 87 through the respective openings in first member 60 and second member 90 securing the cables tightly. Since the cable diameter is smaller than the opening and the ferrules 86 have a larger diameter than the channel 80 and passage 110, the cables 185 and 115 may be releasibly attached to the safety device 55.

The safety shackle device 55 is also provided with one or more safety cables 120. The safety cables 120 are made of wire rope or cable in the preferred embodiment. The safety cables 120 are designed to be stronger, in combination or individually, than the cables 85, 115. Safety cable apertures 125 are located in the legs 65 of the first connecting member 60 for receiving the first ends 130 of the safety cables 120 and securing them. Likewise, the safety cable apertures 135 are located in the legs 96 of the second connecting member 90 for receiving the second ends of the safety cables 120 and securing them therein.

The ends of the safety cables 120 are provided with ferrules 136 for securing the safety cables 120 to the safety shackle device 55. The ferrules 136 prevent the safety cables 120 from slipping through the apertures 125 and 135.

In the working mode, the first cable 85 is placed within the conduit 80 of the first member 60 and secured therein by the first ferrule 86. The second cable 115 is likewise placed within the conduit 110 of the second member 90 and secured therein by the second ferrule 87. The first member 60 is then interfitted with the second member 90 such that the shear pin apertures 145 and 150 axially align. A shear pin 155 is then disposed within the axially aligned apertures 145 and 150. The shear pin 155 is preferably held in place in the safety shackle device 55 by a retainer such as cotter pin 156, which is known to the art.

Figure 5:
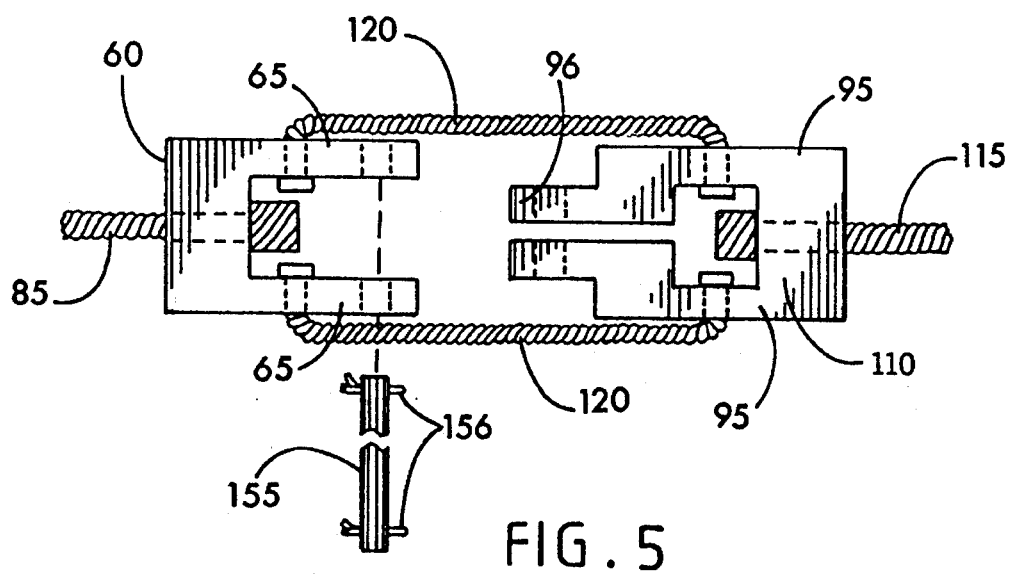

The shear pin 155 is designed to withstand a predetermined load which may be applied from the first cable 85 to the first member 60 and the second cable 115 to the second member 90 thereby transferring a load to the shear pin 155 which connects the two members 60, 90 together. If the predetermined load is surpassed, the shear pin 155 will break or shear at stress points along the shear pin 155, as illustrated in FIG. 5, before either of the cables 85, 115 breaks. When the shear pin 155 shears, the first member 60 separates from the second member 90. However, complete separation is prevented by the safety cables 120 which are attached to both the first member 60 and the second member 90.

Couplers other than shear pins may be contemplated within the scope of this invention. For example, a spring-loaded coupler may be used which has a spring designed to release at a predetermined load. Other devices may be engineered to couple, and release at a predetermined load, that could be incorporated with the present device.

The safety cables 120 are designed such that they will withstand a load greater than the predetermined load the shear pin 155 is designed to withstand. The safety cables 120 are also designed to maintain a greater load than the cables 85, 115, thereby protecting the cable 5 from separating after the shear pin 155 shears. As the shear pin 155 shears, the break can be detected by an operator of the cable yarder system before the cables 85, 115 break, allowing the load to be slowly dropped and the shear pin 155 to be replaced. It is also within the scope of the present invention to provide the safety shackle device 55 with an indicator, such as a flag, flare or electronic transmission to notify the operator of such failure.

Reviewing the cable yarder setup of FIG. 1 once again, it is designed to drag logs 45 from one point on a hillside 46 to another position on the same hillside. All of the cables illustrated therein can be provided with the safety shackle device 55 of the present invention. The safety shackle device 55 is provided to withstand the entire load applied from the logs 45 through the skyline 20 and the mainline 35 up through the crane 15 and into the guyline cables 5. If the logs 45 create a load which overstresses any of the cables in the system, the shear pin 155 of the safety shackle device 55 will shear and the first member 60 will separate from the second member 90. However, the integrity of the cable system will remain intact due to the presence of the safety shackle device 55.

The in-line safety shackle device 55 further provides safety to workers near the cable yarder setup, preventing falling logs 45, falling skylines 20 or dislocated machinery from any part of the cable yarder setup from injuring people. Safety is also provided from recoil of broken cables and wire ropes, since the safety cables 120 will prevent the guyline or any other rope or cable from snapping back and injuring a worker.

Figure 6:
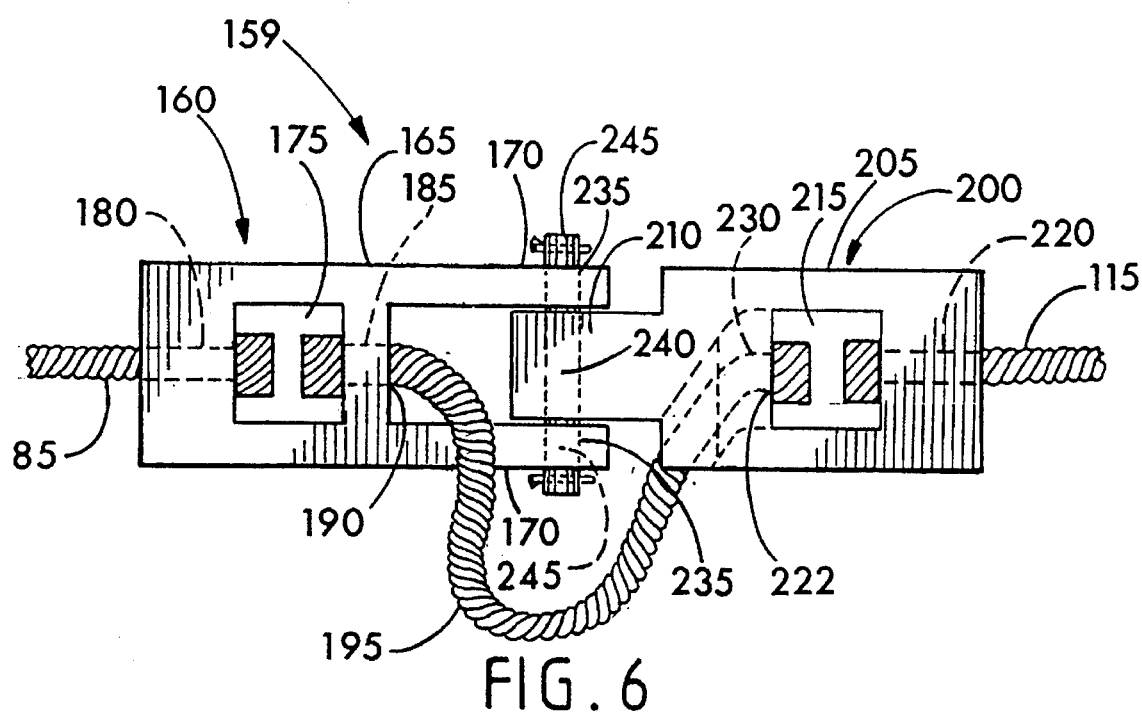
FIG. 6 is a side elevated view of an alternate embodiment of the in-line safety shackle.
Figure 7:
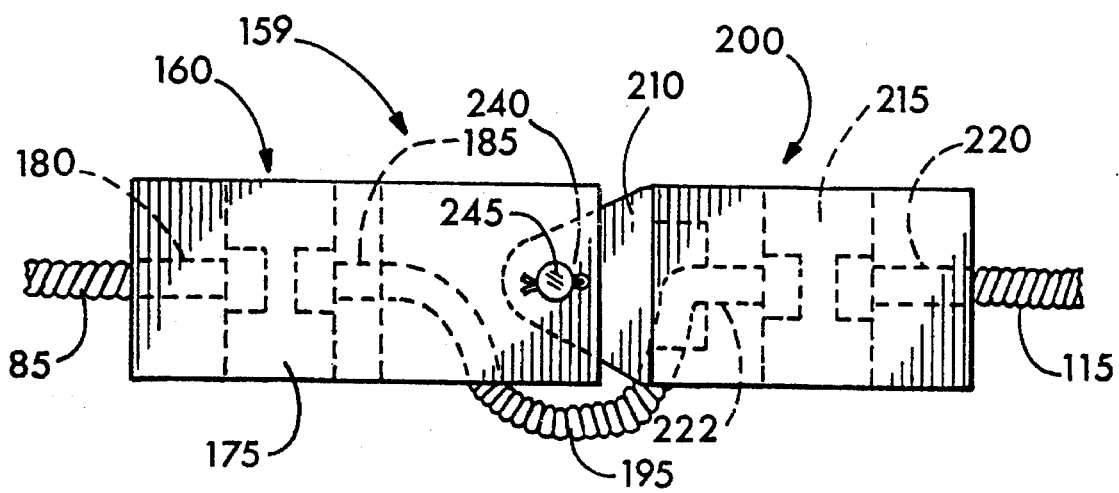
FIG. 7 is a top elevated view of the in-line safety shackle of FIG. 6.

A second embodiment is illustrated in FIGS. 6 and 7, which provides an alternative embodiment of the in-line safety shackle device 159. The safety shackle device 159 includes a first female connecting member 160 provided with a first body portion 165 and first legs 170 extending from the first body portion 165. Each first leg 170 is provided with a shear pin aperture 235. The body portion 165 also includes a first cavity 175, a first cable conduit 180, and a first safety cable aperture 185. The first cable conduit provides for a space to insert the first cable 85, securing it tightly to the first connecting member 160. The safety cable aperture 185 provides a conduit for securing a first end 190 of safety cable 195 to the first connecting member 160.

The safety shackle device 159 is also provided with a second male connecting member 200. The second connecting member 200 includes a second body portion 205 and second flange 210 which extends outwardly from the second body portion 205. The second flange 210 contains a second shear pin aperture 240. The second flange 210 is dimensioned to interfit between the first legs 170 of the first member 160 such that the second shear pin aperture 240 axially aligns with the first shear pin apertures 235. A second cavity 215 is disposed within the second connecting member 200. A second cable conduit 220 and second cable aperture 222 are provided within the second connecting member 200. The second cable conduit 220 provides for a space to insert the second cable 115, securing it tightly to the second connecting member 200. The second safety cable aperture 222 provides a conduit for securing a second end 230 of safety cable 195 to the second connecting member 200.

In the working mode, the first member 160 registers closely with the second member 200 such that the first shear pin apertures 235 and the second shear pin aperture 240 are axially aligned. A shear pin 245 is disposed within the apertures 235, 240 and retained by a device such as a cotter pin. One end of safety cable 195 (designated by reference numeral 190) is attached to the first connecting member 160 by insertion through first safety cable aperture 185 and secured therein by a ferrule. The other end of safety cable 195 is attached to the second connecting member 115 by insertion into the second safety cable aperture 222, and secured therein by a ferrule. The first cable 85 is attached to the first connecting member 160 by insertion into the first cable conduit 180, and secured therein by a ferrule. The second cable 115 is attached to the second connecting member 200 by insertion into the second cable conduit 220, and secured therein by a ferrule.

The shear pin 245 provides for the connection of the first member 160 and the second member 200 in a position to accept a predetermined load transferred to the shear pin 245. The alternate embodiment performs in the same manner as the preferred embodiment. As the load applied to the guyline and through to the shear pin 245 exceeds the predetermined limit, the pin 245 shears and the members 160 and 200 separate. The safety cable 195 takes up the slack, holding the cables 85 and 115 together until the shear pin 245 can be replaced.

The foregoing is considered as illustrative only of the principles of the invention. Further, since numerous modifications and changes will readily occur to those skilled in the art, it is not desired to limit the invention to the exact construction and operation shown and described. Therefore, accordingly all suitable modifications and equivalents fall within the scope of the invention.

What is claimed is:

1. An in-line safety shackle device for a cable system including a first cable and a second cable comprising:
   a. a first member adapted to engage an end of the first cable;
   b. a second member adapted to engage an end of the second cable, wherein the second member releasably interfits with the first member to move between an interfitting and released positions, the released position providing a greater separation between the ends of the first and second cables compared with the interfitting position;
   c. at least one auxiliary cable securing the first member to the second member and permitting movement between the interfitting and released positions; and
   d. means releasably holding the first member and the second member in the interfitting position only if a force applied to move the first and second members to the released position is less than a predetermined amount which is less than a strength of the first and second cables, the means being provided with a predetermined shear force sufficient to release the first member from the second member before the first or second cable breaks.

2. The device of claim 1 wherein the means releasably holding the first member to the second member is a shear pin.

3. The device of claim 2 wherein the first member includes a first shear pin aperture and the second member includes a second shear pin aperture, wherein the first and second shear pin apertures axially align to receive the shear pin when the first member interfits with the second member.

4. The device of claim 2 wherein the shear pin includes means preventing the shear pin from being removed from the device.

5. The device of claim 4 wherein the means preventing the shear pin from being removed is a cotter pin.

6. The device of claim 1 including a second auxiliary cable securing the first member to the second member.

7. The device of claim 1 wherein the first member includes means to removably engage the first cable.

8. The device of claim 7 wherein the means to removably engage the first cable is a ferrule removably seated in the first member and sized to receive the end of the first cable.

9. An in-line safety shackle device for a cable system having a defined tensile strength and including a first cable and a second cable, the device comprising:
   a. a first member adapted to releasably engage the first cable, the first member including a first cable conduit and a first shear pin aperture, the first member further including at lease one auxiliary cable aperture for receiving a first end of an auxiliary cable;
   b. a second member adapted to releasably engage the second cable, the second member including a second cable conduit and a second shear pin aperture, wherein the second member is adapted to releasably interfit with the first member, the second member further including at least one auxiliary cable aperture for receiving a second end of the auxiliary cable;
   c. at least one of said auxiliary cable having said first end attached to the first member through the auxiliary cable aperture and said second end attached to the second member through the auxiliary cable aperture, wherein the auxiliary cable permits a predetermined separation of the first and second members to a release position and resists further separation of the first and second members by forces greater than a release force;
   d. a shear pin connecting the first member to the second member, wherein the shear pin is designed to shear at the release force wherein the release force being less than the defined tensile strength of the cable system.

* * * * *